Feb. 3, 1948.   R. W. BROWN   2,435,465
LANDING GEAR AND BRAKE FOR AIRCRAFT
Filed Feb. 15, 1945   2 Sheets-Sheet 1

INVENTOR
ROY W. BROWN
By
ATTORNEYS

Feb. 3, 1948.   R. W. BROWN   2,435,465
LANDING GEAR AND BRAKE FOR AIRCRAFT
Filed Feb. 15, 1945   2 Sheets-Sheet 2
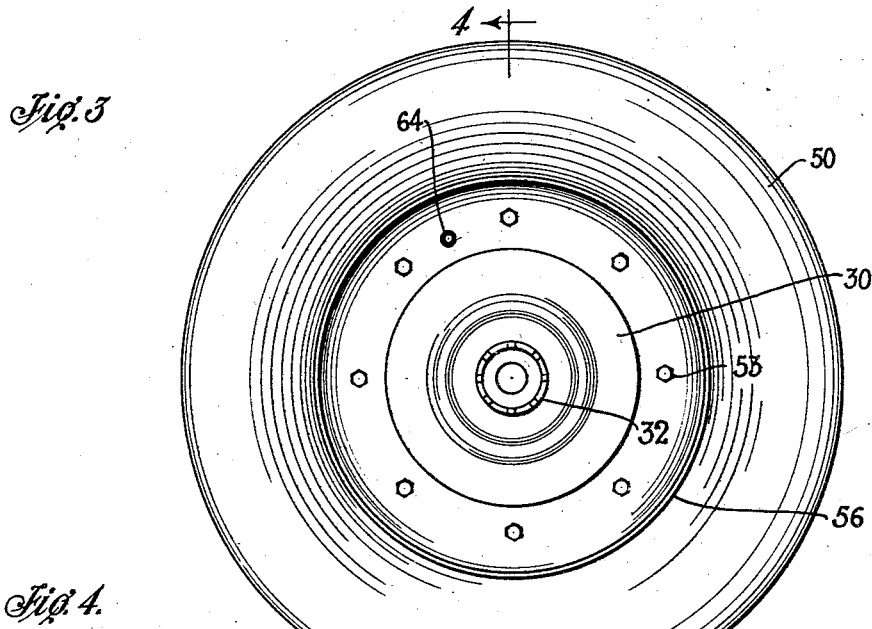
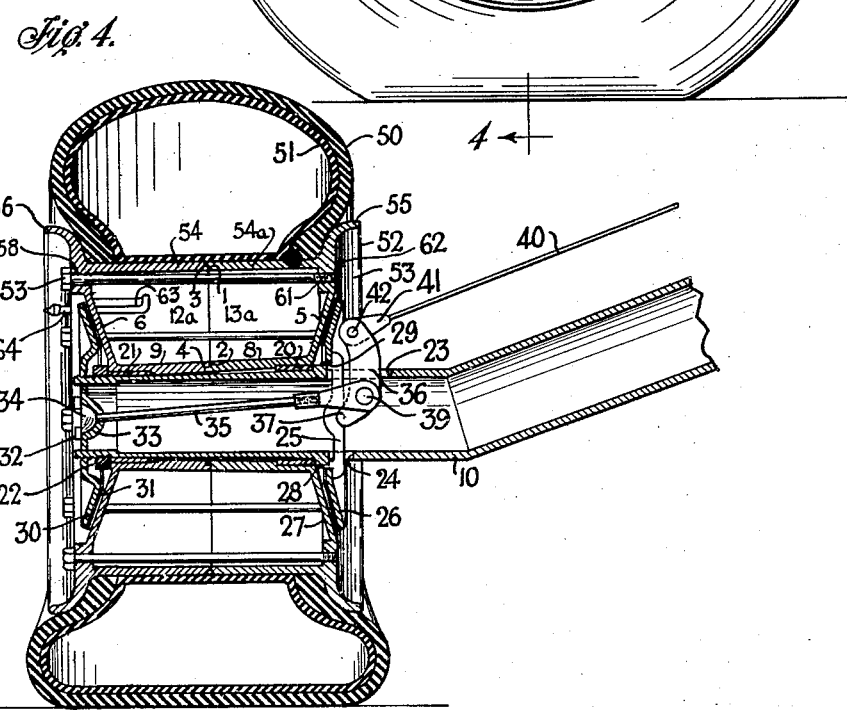
Inventor
ROY W. BROWN Patented Feb. 3, 1948

2,435,465

UNITED STATES PATENT OFFICE 2,435,465

LANDING GEAR AND BRAKE FOR AIRCRAFT

Roy W. Brown, Akron, Ohio, assignor to The Firestone Tire & Rubber Company, Akron, Ohio, a corporation of Ohio Application February 15, 1945, Serial No. 577,965

3 Claims. (Cl. 188—18)

This application relates to an airplane type landing wheel and brake and it is a continuation in part of my co-pending application Serial No. 500,171, filed August 26, 1943, now abandoned. It is a general object of the invention to produce a cheap and extremely light-weight wheel, yet one which will be strong and which will, in combination with its inflated tire, serve to resist the strains imposed upon it in landing of the aircraft and more effectively cushion the load upon landing and in taxiing. The brake is, in effect, an integral part of the wheel and while very simple in its construction, involving few parts and adding little weight to the structure, has sufficient power to hold the aircraft stationary preparatory to taking off and also will quickly stop the same when applied on landing.

The wheel is adapted to be manufactured by spinning or pressing a simple U-shaped section which will serve as a hub, tire supporting and retaining member and also as a braking surface. While it is not essential that any particular tire be used with the wheel and brake combination, one embodiment of the invention contemplates employment of a so-called tubeless tire and in the use of such a tire with the particular wheel and brake combination hereinafter disclosed, a novel and particularly effective landing gear is realized.

The wheel design assists in cushioning the aircraft as it is taxied over the ground and also relieves the tire of excessive increases in pressure upon hard landings or in the event of other abusive treatment. The volume of air enclosed within the tire itself has added to it a volume of air enclosed within the wheel structure and it is upon this total volume of air under relatively low pressure that the aircraft is sustained and cushioned when on the ground or other landing area. The amount of air contained within the wheel is a very appreciable percentage of that in the tire itself and thus, for any pressure of inflation, the flexing of the tire or distortion of the same upon hard landings or in taxiing over exceedingly rough surfaces is much greater than would be the case if the only cushioning effect were by air contained in the tire only. Varitaions in pressure are not as pronounced and for that reason, a tubeless tire is much more successful when employed with a wheel of this type than otherwise. Leakage of air at the bead is not nearly so likely since it is a fact that with a tubeless tire, leakage usually occurs when the tire is subjected to excessive distortion in combination with relatively great increases in the pressure contained therein.

The increased volume of air allows more heat to be generated by the brake directly upon the wheel without increasing the pressure of the air to an extent which would affect the cushioning of the tire or the seal thereof.

The weight of the wheel and tire is kept at a minimum since the wheel itself is exceedingly simple in construction and in one form has no inner tube associated with the tire. Plain bearings are used, thereby saving expense, simplifying the construction and rendering it lighter in weight. The braking effect is obtained by a pair of disk type brakes, one at each side of the wheel and acting upon the wheel disks which themselves serve as braking surfaces thereby making it unnecessary to provide independent brake drums. The brake disks are applied to the wheel disks by a very simple actuating mechanism which may be of mechanically or hydraulically operated type. The mechanical brake actuating means illustrated herein is simple and effective, yet serves to apply the brake shoes equally at both sides of the wheel thereby being in substantial balance and not requiring special thrust bearings to resist any tendency to force the wheel along its axle whenever the brake is applied.

The wheel disks and brake disks taper inwardly toward the hub of the wheel thereby increasing the efficiency of the brakes and at the same time enabling them to be contained within the crosssectional width of the wheel and tire, that is, the brakes do not add to the total width of the wheel and tire, and therefore wind resistance is no greater than that which would be set up by the tire alone. For these reasons, the landing gear herein described is especially adapted to be used on planes or other aircraft of a type having landing gear that is not retractible during flight. It is especially adapted for, although not necessarily to be used only on, aircraft of the autogiro or helicopter type. It may be used on small planes or in fact on any other type of aircraft desired.

In the following paragraphs, two embodiments of the invention are described with reference to the accompanying figures of drawings in which:

Fig. 3 is similar to Fig. 1 except a conventional tire and tube and a specially constructed tire rim are shown; and Fig. 4 is a diametric section through the wheel taken on line 4—4 of Fig. 3.

Figure 1:
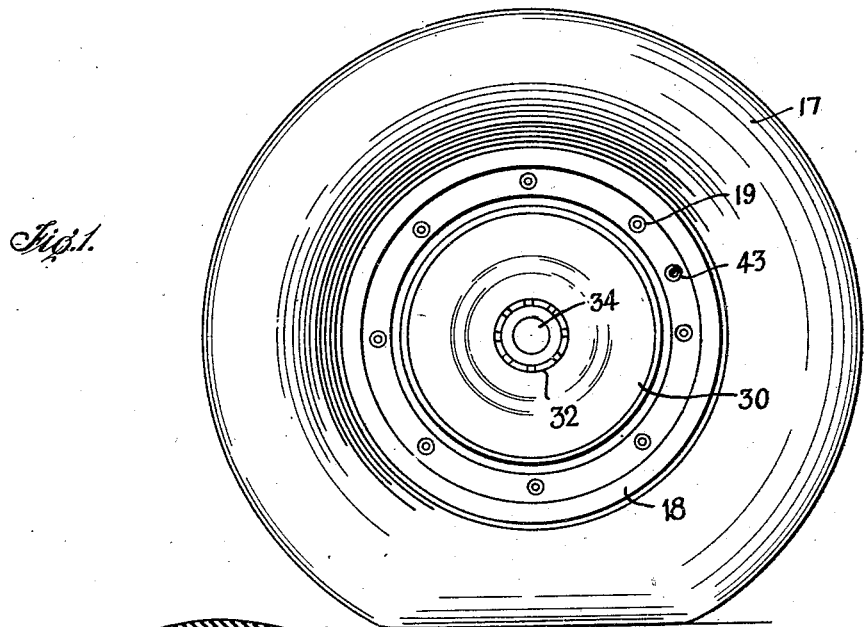
Fig. 1 is an elevation of a wheel and tubeless tire embodying the invention, the hub cap being removed.
Figure 2:
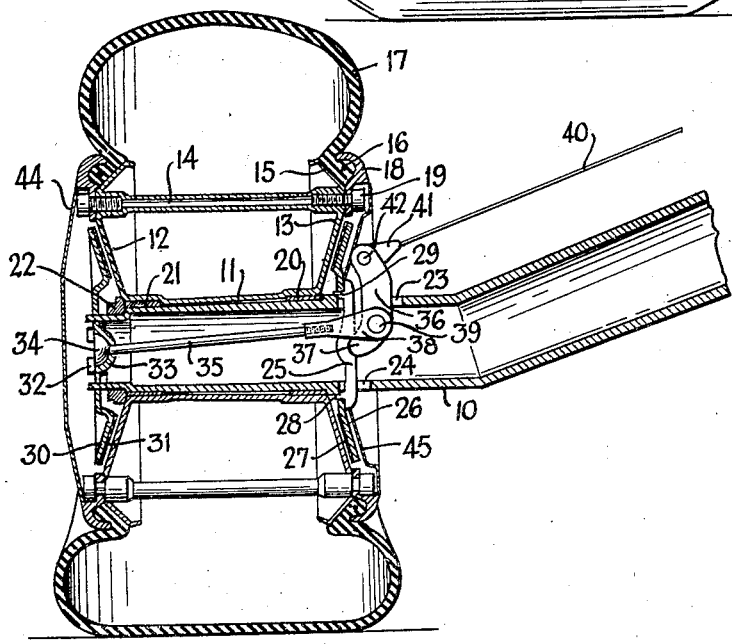
Figure 2 is a diametric section through the wheel illustrating the construction of the wheel, tire, brake and a typical supporting axle.

Now referring to Figures 1 and 2 of the drawings, an axle 10 is shown broken away as the same extends upwardly toward the fuselage of the plane or other aircraft and it is to be understood that this axle may be of any type such as employed for the purpose. It may have shock absorbing and damping means of any of the well-known constructions and may attach to the aircraft in a manner permanently to be held in position, or if desired, may be made retractable as is commonly done with aircraft adapted to be operated at higher speeds.

The wheel itself is made by spinning or pressing, and comprises a hub 11 having conical wheel disks 12 and 13, said disks being spaced apart and maintained in rigid relationship by means of a plurality of spacing tubes 14. These tubes are welded to the disks thereby making, when the tire is mounted, an air-tight assembly which is extremely light yet strong and rigid. The disks diverge outwardly to the region where the spacing tubes 14 are attached, then taper inwardly at 15 at about an angle of 45°, thereby serving as seats for the flat part of the tire beads 16 of a tubeless tire generally indicated by numeral 17.

The tire beads are held under pressure against the tapering bead seats 15 since at each side a bead clamping ring 18 is maintained in position and in clamping engagement with the tire bead by means of screws 19. These screws are threaded into the ends of the tubes 14 and there will be a sufficient number of tubes so that the bead clamping rings may be held at closely spaced points about their circumferences, the spacing depending upon the number of screws required to secure adequate clamping to provide a seal. For a fuller description of such a ring, bead and clamping thereof, reference is made to Patents 1,908,282 and 2,265,346. Of course, other types of tubeless tires may be employed and in the event it is not desired to use a tubeless tire, a tire and inner tube may be mounted and the construction of the wheel altered accordingly so as to accommodate the mounting of whatever type tire is to be used.

Bearings 20 and 21 are pressed into the hub 11, one at either end, these bearings being pressed in against a shoulder which is formed by a reduced diameter of the central hub portion. The axle 10 is turned down to form a bearing surface for these bearings, and a shoulder against which bearing 20 abuts prevents axial movement of the wheel inwardly on the axle, while a nut 22 is threaded onto the end of the axle to hold the wheel against axial displacement in that direction. This nut 22 is locked in adjusted position by any of the well-known locking methods.

The inner end of the wheel hub axle 10 is slotted as shown at 23 and at 24. A yoke 25 of rigid construction passes through these slots and bears against the outer side of a brake disk 26. This brake disk is dished and carries on its inner conical face a conical brake liner 27 which engages against the conical wheel disk 13 whenever the brake is applied. The yoke 25 has lugs 28 and 29 by means of which that yoke is prevented from falling out of slots 23 and 24 after the complete wheel and brake are assembled, and furthermore, these lugs engage within notches in the disk 26 thereby retaining that disk against rotation with the wheel when the brake is applied.

At the outer end of the axle a second brake disk 30 carries a brake liner 31 corresponding to the liner 27. The said liner is engageable with the wheel disk 12, and the taper of this disk corresponds to that at the inner side of the wheel so that the areas of the braking surfaces are equal, their taper is equal, and when applied the braking forces tend to be equalized thereby assuring that these forces are evenly applied at the bearings and do not create any appreciable thrust so that it is possible to use the plain bearings 20 and 21 and take any thrust forces set up on landing by the shoulder on the axle and the retaining nut 22.

The end of axle 10 is machined or slotted so as to leave projections 32, six in number, which extend through corresponding slots in the disk 30 to prevent rotation of the disk with the wheel, but allow it to move endwise of the wheel. The disk is also deformed inwardly as at 33 to form a socket for the upset end 34 of the rod 35 by means of which disk 30 is drawn inwardly frictionally to apply the brake against the disk 12.

A lever 36 is positioned in the slot 23 and has a toe 37 which engages within a milled notch in the yoke 25. This notch is deep enough so that with reasonable adjustment of the parts any movement of the same would never allow the toe 37 to come out of the notch. The rod 35 is threaded into a clevis 38 which hinges at 39 to the lever 36. The cable 40 is retained in a second clevis 41 that is attached by a pin 42 to the upper end of lever 36. Whenever the brake is to be applied, the pilot of the aircraft, by means of a pedal or other appropriate means, causes the cable 40 to be tightened thereby pulling on the outer end of lever 36 and pushing on the yoke 25 so as to apply the inner disk 26 against wheel disk 13. At the same time, and with substantially equal force, the rod 35 will be drawn inwardly of the axle so as to draw disk 30 into braking engagement with wheel disk 12.

Since the wheel disks and the brake disks are complementally dished as shown and described, the braking force for any given pressure of application will be substantially increased. The whole tendency of the braking mechanism is to center itself about the axle 10 and to equalize application of any operating pressure applied thereto. If desired, the brake disks and liners normally may be held away from the wheel disks by spring means (not shown). Hydraulic brake-actuating devices may be employed, either to take the place of the mechanical operation provided for the cable 40, or the hydraulic mechanism may be substituted in place of the lever 36, rod 35 and other parts maintained within the axle and wheel assembly.

Inflation of the tire and wheel is through any suitable valve preferably located on the pitch circle passing through the screws 19. Such a valve is indicated at 43. A hub cap 44 snaps into position within the outer bead rings and protects the wheel and brake mechanism against water and dirt from the outside, and also serves to streamline the wheel. At the inner side of the wheel a plate 45 serves a similar purpose.

Rod 35 serves to adjust slack in the brake operating means. It is locked in position since the upset end of the rod is adapted to snap into locked positions determined by notches in the socket 33. The rod may be turned by force, but not accidentally.

Coming now to Figs. 3 and 4 it will be seen that there is illustrated therein a construction which is the same as that shown in Figs. 1 and 2 except that an ordinary tire 50, and its inner tube 51, are mounted on a circumferentially split tire rim generally identified as 52. Said tire rim comprises two annular parts 12a and 13a. The parts 12a and 13a are clamped together by a plurality of bolts 53 spaced at circumferential intervals near the circumference of the wheel, the bolts extending through bolt holes 58 in part 12a and being threaded into threaded bolt holes 61 in the part 13a. Said parts 12a and 13a include respective integrally formed tire rim flanges 56 and 55 and rim base portions 54 and 54a that extend axially toward each other; also, axially extending hub-like portions 9 and 8 with annular radially extending wheel disk portions 5 and 6 that diverge outwardly from the hub. Said parts 12a and 13a have confronting annular laterally facing step-offs 2 and 1, and 4 and 3, respectively, which step-offs interfit to hold parts 12a and 13a in alignment as readily will be understood by those familiar with the art. An inner tube valve stem slot 63 is formed in the base portion 54 through which slot a tube valve 64 projects.

It will now be seen that the embodiment of the invention shown in Figs. 3 and 4 has all the advantages over the prior art of the embodiment shown in Figs. 1 and 2 except such advantages as are peculiar to the increased air volume and lightness of the form of the inventions shown in Fig. 1.

The invention has been described with reference to two preferred embodiments of the same, and it is to be understood that variations may be resorted to without departing from the spirit and scope of the invention as originally conceived and as defined in the appended claims.

What is claimed is:

1. An airplane type wheel having in combination a wheel having a hub formed with integral wheel disks at each end thereof, a brake shoe each including a brake disk and brake liner positioned beside each wheel disk, and operating means for forcing the brake shoes into engagement with the wheel disks, said operating means including a yoke, a lever having a toe engageable with the yoke, a link connected to the lever intermediate the ends thereof and extending through the hub of the wheel to connect at its opposite end to the center portion of the opposite brake shoe, and a cable connected to said lever so that upon tensioning the cable the lever will be swung in a direction to draw the brake shoes toward each other and into operative engagement with the wheel disks.

2. In combination, a wheel and an axle, said axle being tubular and supporting the wheel for rotation, a brake shoe at each side of the wheel, and brake actuating means including a lever extending through a slot in the tubular axle and engageable with means connecting one brake shoe to the opposite brake shoe whereby upon movement of the lever, the brake shoes will be drawn laterally toward each other and relatively of the wheel for applying the brakes to the opposite sides of the wheel.

3. In combination, a wheel and an axle, said axle being tubular and supporting the wheel for rotation, a brake shoe at each side of the wheel, and brake actuating means including a lever extending through an opening in the tubular axle and engageable with means connecting one brake shoe to the opposite brake shoe whereby upon movement of the lever, the brake shoes will be drawn laterally toward each other and relatively of the wheel for applying the brakes to the opposite sides of the wheel.

ROY W. BROWN.

REFERENCES CITED

The following references are of record in the file of this patent:

UNITED STATES PATENTS

| Number | Name | Date |
| --- | --- | --- |
| 1,928,866 | Newhart | Oct. 3, 1933 |
| 1,977,981 | Bates | Oct. 23, 1934 |
| 2,109,648 | Poage et al. | Mar. 1, 1938 |
| 2,174,398 | Farmer | Sept. 26, 1939 |